US010746941B2

(12) United States Patent
Hsu et al.

(10) Patent No.: US 10,746,941 B2
(45) Date of Patent: Aug. 18, 2020

(54) FIBER OPTIC CONNECTOR

(71) Applicants: Gloriole Electroptic Technology Corp., Kaohsiung (TW); SHEN ZHEN WONDERWIN TECHNOLOGY CO., LTD., Shenzhen (CN); Fiberon Technologies, Inc., Westborough, MA (US)

(72) Inventors: Shu-Hui Hsu, Kaohsiung (TW); Yen-Chang Lee, Kaohsiung (TW)

(73) Assignees: Gloriole Electroptic Technology Corp., Kaohsiung (TW); Shen Zhen Wonderwin Technology Co., Ltd., Shenzhen (CN); Fiberon Technologies, Inc., Westborough, MA (US)

( * ) Notice: Subject to any disclaimer, the term of this patent is extended or adjusted under 35 U.S.C. 154(b) by 0 days.

(21) Appl. No.: 16/451,307

(22) Filed: Jun. 25, 2019

(65) Prior Publication Data

US 2020/0012052 A1 Jan. 9, 2020

(30) Foreign Application Priority Data

Jul. 4, 2018 (TW) .............................. 107209026 U

(51) Int. Cl.
*G02B 6/38* (2006.01)
*H01R 13/639* (2006.01)
(52) U.S. Cl.
CPC ........... *G02B 6/3825* (2013.01); *G02B 6/383* (2013.01); *G02B 6/3869* (2013.01); *G02B 6/3882* (2013.01); *G02B 6/3893* (2013.01); *H01R 13/639* (2013.01)
(58) Field of Classification Search
CPC .... G02B 6/3825; G02B 6/383; G02B 6/3869; G02B 6/3882; G02B 6/3893; H01R 13/639
USPC .......................................................... 385/53
See application file for complete search history.

(56) References Cited

U.S. PATENT DOCUMENTS

2019/0267748 A1* 8/2019 Kawahara .............. H01R 13/42

* cited by examiner

*Primary Examiner* — Jerry M Blevins
(74) *Attorney, Agent, or Firm* — Michael Best & Friedrich LLP

(57) ABSTRACT

A fiber optic connector includes a positioning member formed with two installation holes and two guiding grooves, two central rods and a locking member. The locking member has two guiding portions and is operable to move relative to the positioning member between a locking position, where each of the guiding portions extends into an intersection of the corresponding guiding groove and the corresponding installation hole to engage an annular groove of the corresponding central rod for restricting movement of the central rods along the installation holes, and an open position, where the guiding portions are disengaged from the annular grooves, thereby allowing the central rods to move along the installation holes.

1 Claim, 7 Drawing Sheets

US 10,746,941 B2

FIBER OPTIC CONNECTOR

CROSS-REFERENCE TO RELATED APPLICATION

This application claims priority of Taiwanese Patent Application No. 107209026, filed on Jul. 4, 2018.

FIELD

The disclosure relates to a connector, and more particularly to a fiber optic connector.

BACKGROUND

Referring to FIG. 1, a conventional fiber optic connector 1 includes a housing member 11, a connecting member 12 connected to a front end of the housing member 11, and two central rods 13 that are partially inserted into the connecting member 12 in a front-rear direction, with front ends thereof being exposed outside of the connecting member 12 and rear ends thereof being press-fitted into the connecting member 12. The central rods 13 are pivotal in optical fiber connection and communication, as they are adapted for optical fibers (not shown) to extend therethrough to be electrically connected to other devices. However, to replace the malfunctioned central rods 13, a user would need to use pliers or other instruments to physically pull out the central rods 13 from the connecting member 12, potentially damaging the central rods 13 or other components of the fiber optic connector 1 in the process.

SUMMARY

Therefore, an object of the disclosure is to provide a fiber optic connector that can alleviate the drawback of the prior art.

According to the disclosure, the fiber optic connector includes a housing member, a positioning member that is mounted in the housing member, two central rods and a locking member. The positioning member is formed with two installation holes extending in a front-rear direction and two guiding grooves each intersecting a respective one of the installation holes. The central rods are respectively and removably inserted into the installation holes. Outer surrounding surface of each of the central rods is formed with an annular groove that is registered with a corresponding one of the guiding grooves.

The locking member extends through the housing member to be inserted into the positioning member, and includes a control portion disposed outside of the housing member, and two guiding portions respectively extending from two opposite ends of the control portion to be respectively inserted into the guiding grooves of the positioning member. The locking member is operable to move relative to the positioning member between a locking position, where each of the guiding portions extends into an intersection of the corresponding guiding groove and the corresponding installation hole to engage the annular groove of the corresponding central rod for restricting movement of the central rods along the installation holes, and open position, where the guiding portions are disengaged from the annular grooves of the central rods, thereby allowing the central rods to move along the installation holes.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
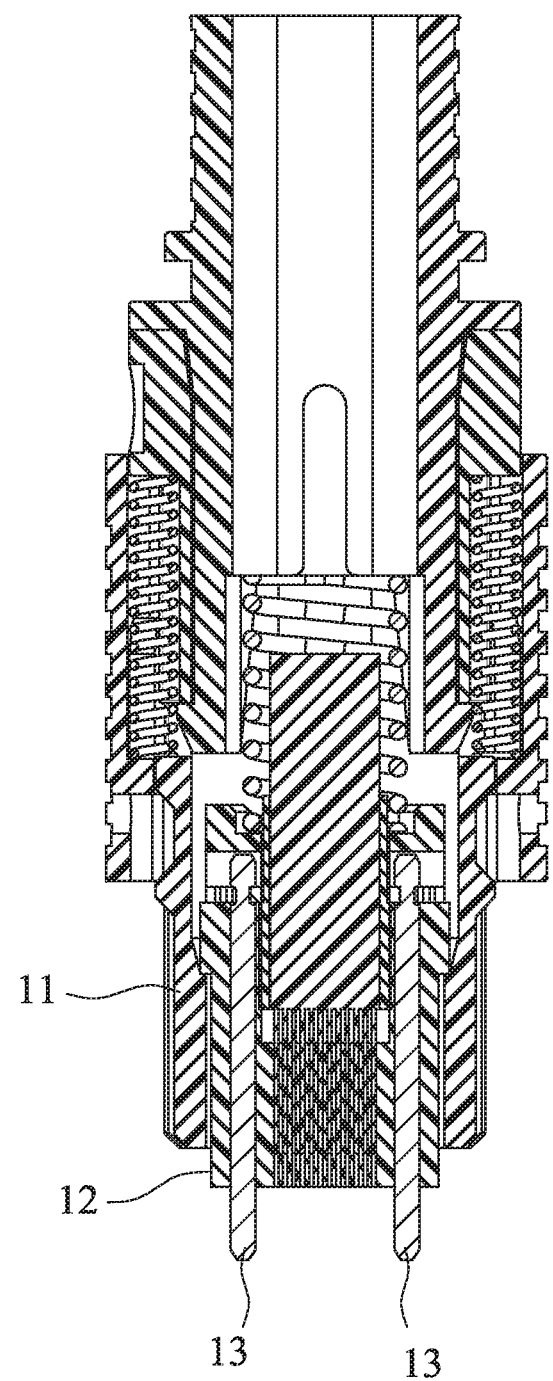
FIG. 1 is a sectional view of a conventional fiber optic connector.
Figure 2:
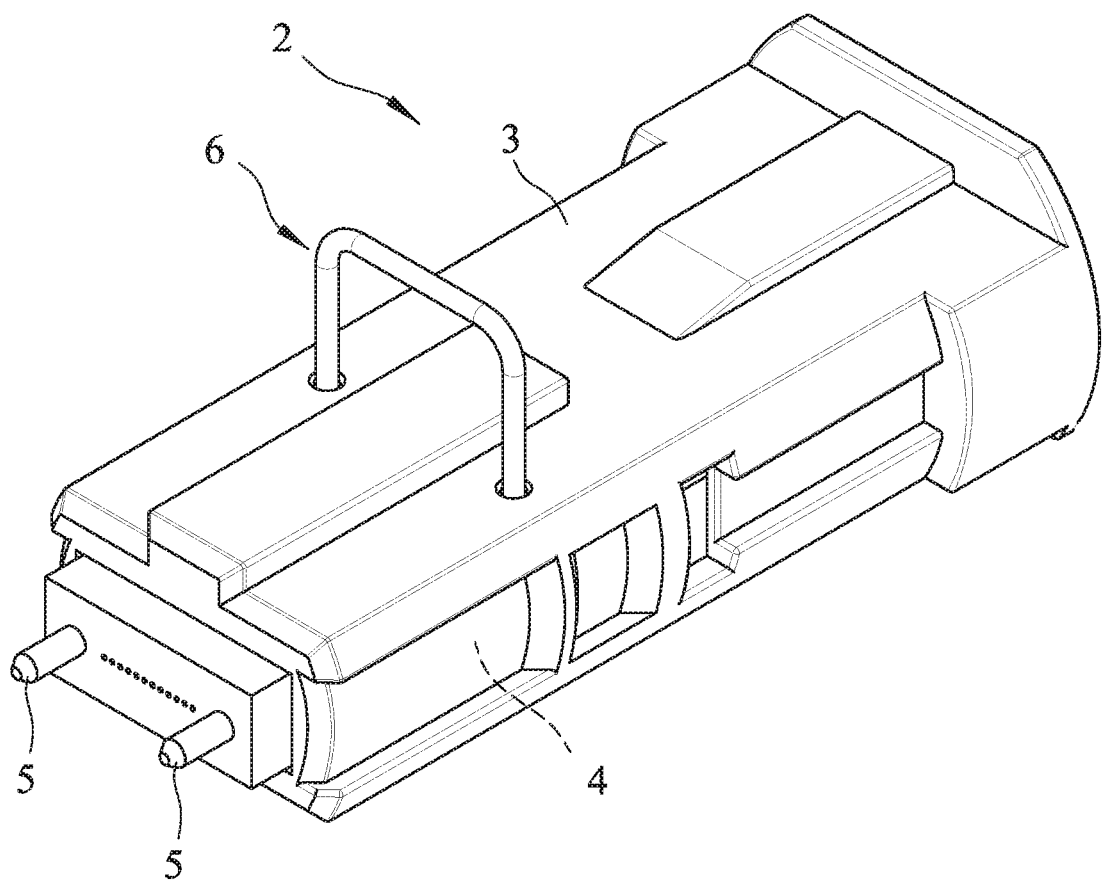
FIG. 2 is a perspective view of an embodiment of a fiber optic connector according to the disclosure.
Figure 3:
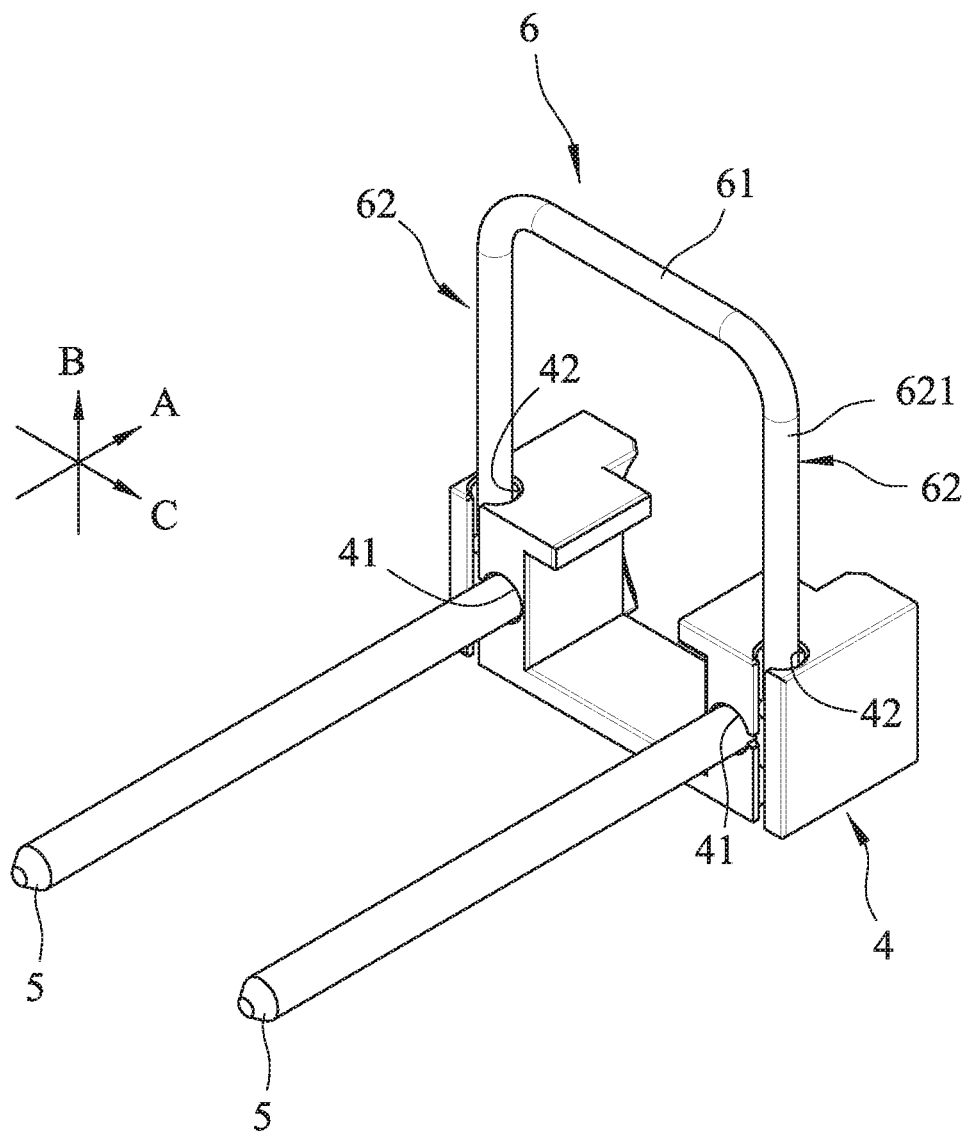
FIG. 3 is a perspective view illustrating a positioning member, a locking member and two central rods of the embodiment.

Referring to FIGS. 2 and 3, an embodiment of a fiber optic connector according to the disclosure includes a housing member 3, a positioning member 4 that is mounted in the housing member 3, two central rods 5, and a locking member 6 that extends through the housing member 3 to be inserted into the positioning member 4.

Figure 4:
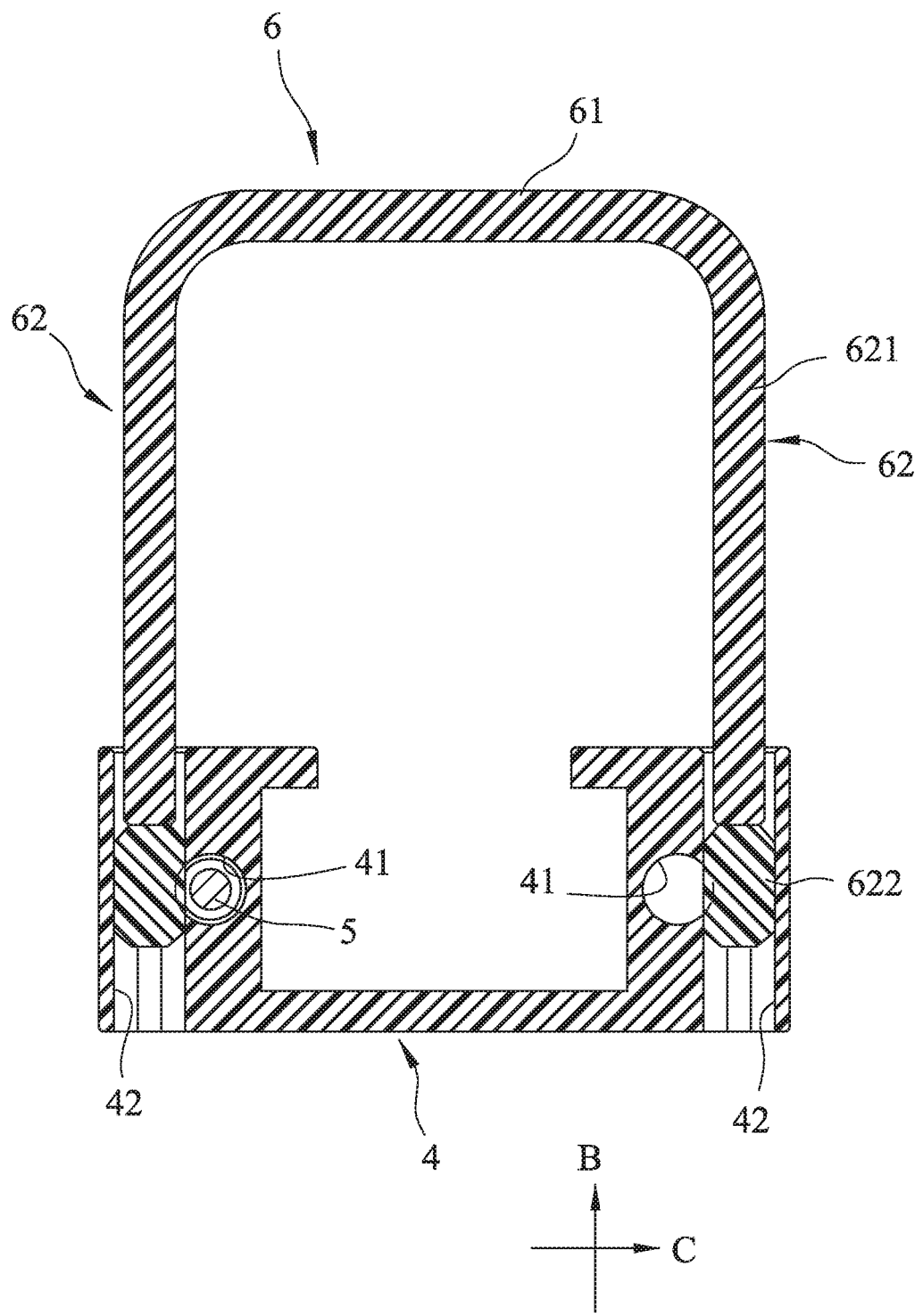
FIG. 4 is a front sectional view of the embodiment, illustrating the locking member at a locking position (only one central rod is shown)
Figure 5:
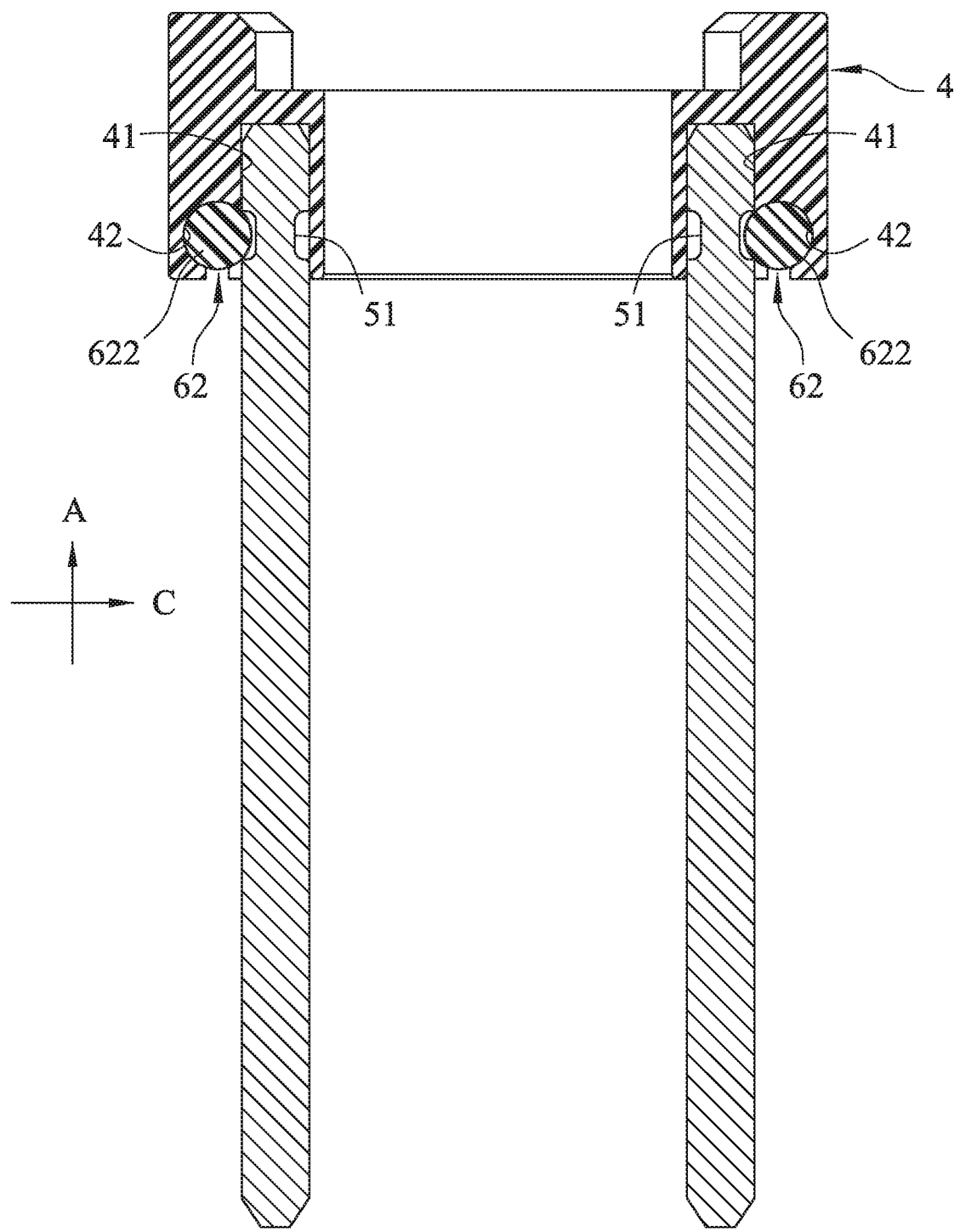
FIG. 5 is a top sectional view of the embodiment, illustrating the locking member engaging the central rods.

Referring to FIGS. 3 to 5, the positioning member 4 is formed with two installation holes 41 extending in a front-rear direction (A), and two guiding grooves 42 each extending in a first direction (B) perpendicular to the front-rear direction (A), and intersecting a respective one of the installation holes 41. The central rods 5 are spaced apart from each other in a second direction (C) perpendicular to the front-rear direction (A) and the first direction (B), with rear ends thereof being respectively and removably inserted into the installation holes 41. Referring specifically to FIG. 4, only one central rod 5 is shown to illustrate the intersection of one of the installation holes 41 and a corresponding one of the guiding grooves 42. Outer surrounding surface of each of the central rods 5 is formed with an annular groove 51 which is registered with the corresponding one of the guiding grooves 42. The locking member 6 includes a control portion 61 disposed outside of the housing member 3 and extending in the second direction (C), and two guiding portions 62 respectively extending from two opposite ends of the control portion 61 in the first direction (B) to be respectively inserted into the guiding grooves 42 of the positioning member 4. Each of the guiding portions 62 has a connecting section 621 that is connected to the control portion 61, and an end section 622 that is distal from the control portion 61 and that has a radius larger than that of the connecting section 621.

An user may drive the guiding portions 62 of the locking member 6 to move along the guiding grooves 42 of the positioning member 4 via pulling or pushing the control portion 61 of the locking member 6. The locking member 6 is operable to move relative to the positioning member 4 in the first direction (B), between a locking position and an open position. Referring back to FIGS. 4 and 5, at the locking position, the end section 622 of each of the guiding portions 62 extends into the intersection of the corresponding guiding groove 42 and the corresponding installation hole 41 to engage the annular groove 51 of the corresponding central rod 5 for restricting movement of the central rods 5 along the installation holes 41, thereby positioning the central rods 5 relative to the positioning member 4.

Figure 6:
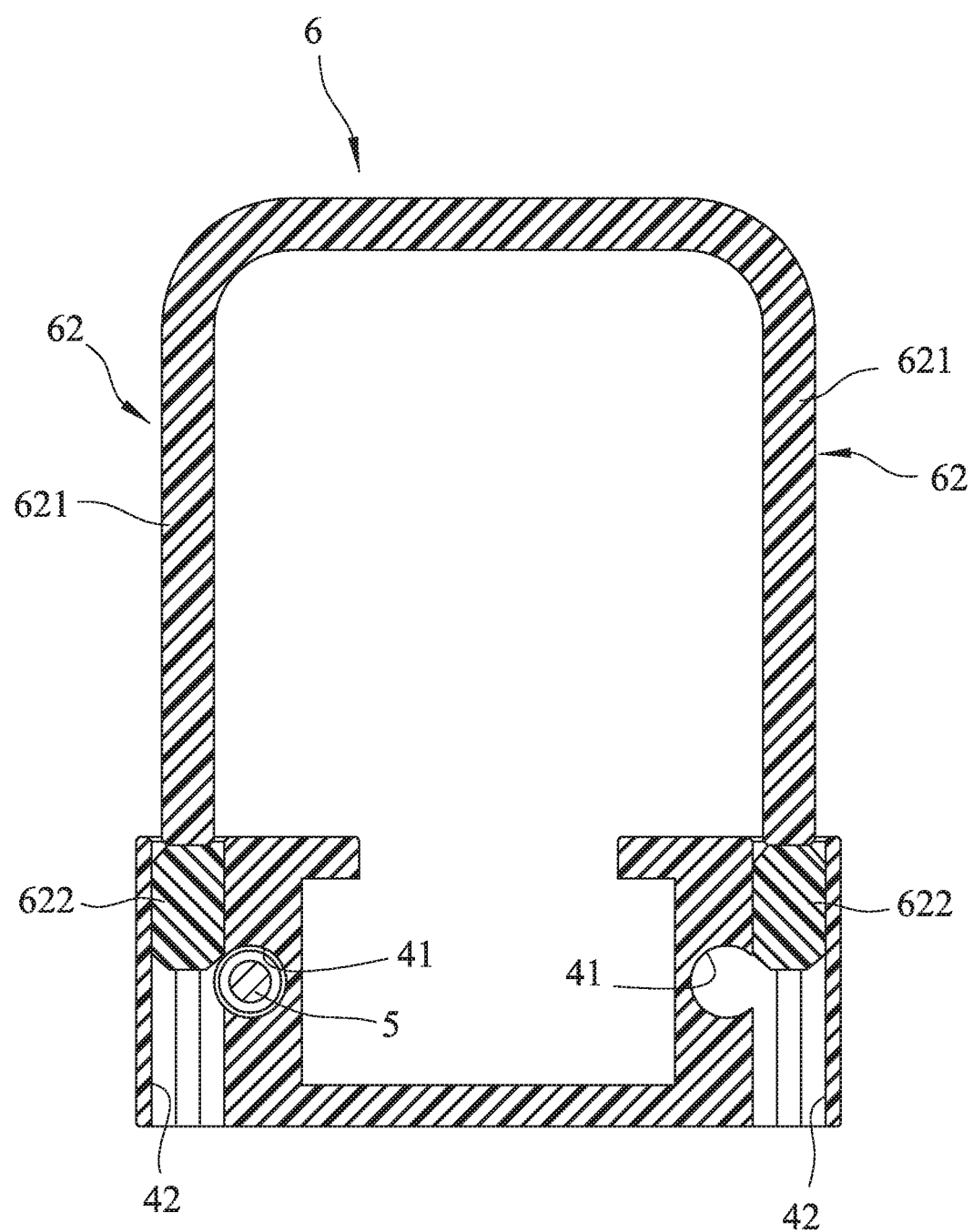
FIG. 6 is a view similar to FIG. 4, illustrating the locking member at an open position.
Figure 7:
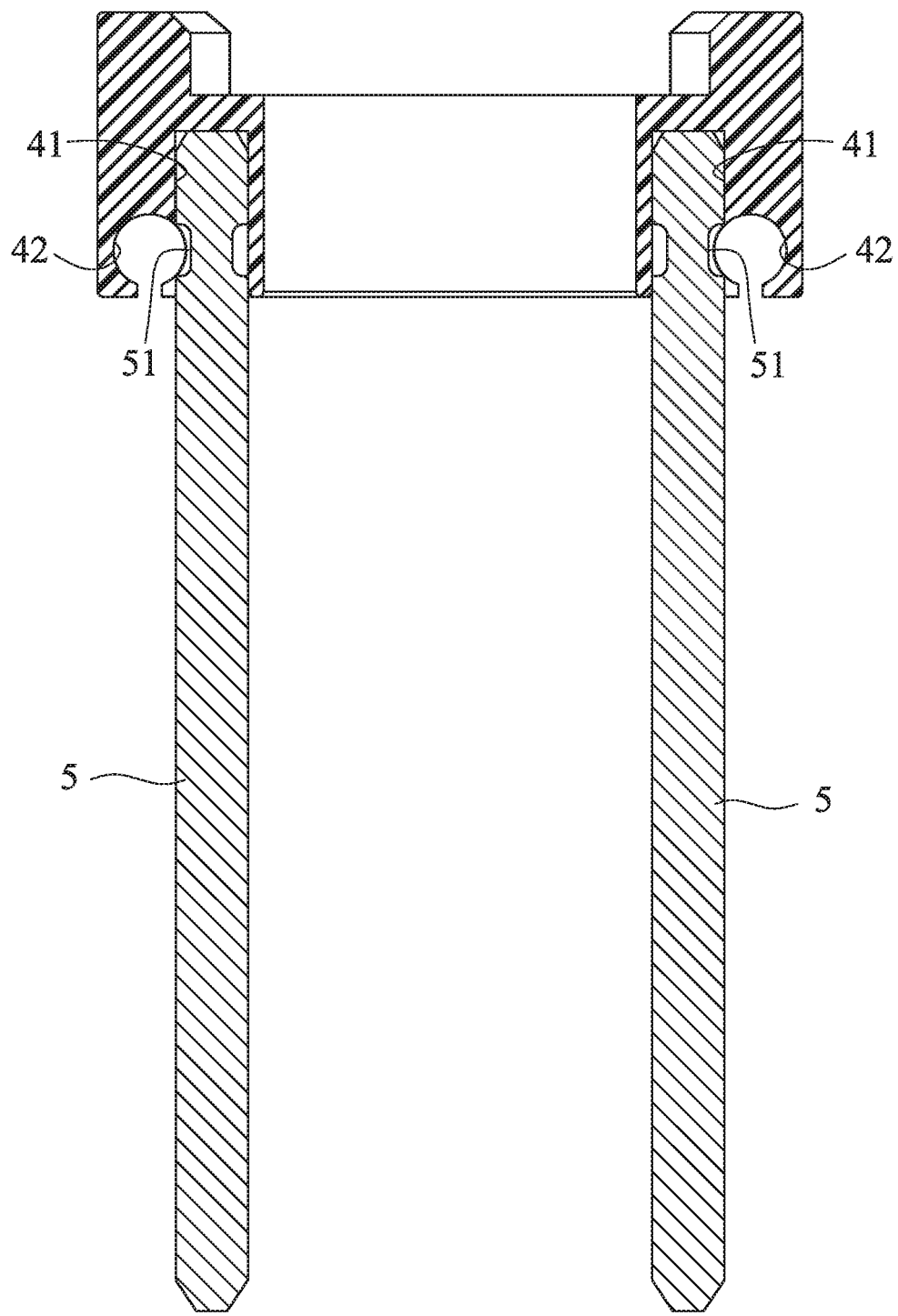
FIG. 7 is a view similar to FIG. 5, illustrating the locking member being disengaged from the central rods.

Referring to FIGS. 3, 6 and 7, when the locking member 6 is moved from the locking position to the open position, the end sections 622 are driven by the connecting sections 621 to move along the guiding grooves 42. Once the locking member 6 is at the open position (as shown in FIG. 6), the end sections 622 are respectively removed from the installation holes 41 and disengaged from the annular grooves 51 of the central rods 5, such that the central rods 5 are no longer restricted from movement by the end sections 622 and are allowed to move along the installation holes 41. The central rods 5 may be easily pulled out and replaced when the locking member 6 is at the open position. In addition, the locking member 6 may be simply removed from the positioning member 4 to allow free movement of the central rods 5.

In this embodiment, the radius of each of the connecting sections 621 is smaller than that of the end sections 622, and is configured such that when the control portion 61 is either pulled or pushed and if, instead of the end sections 622, each of the connecting sections 621 is driven to be registered with the intersection of the corresponding guiding groove 42 and the corresponding installation hole 41, each of the connecting sections 621 would not engage the annular groove 51 of the corresponding central rod 5, thereby allowing the central rods 5 to move along the installation holes 41. In other embodiments, the radius of each of the connecting sections 621 may be designed to be the same as that of the end sections 622 so that the guiding portions 62, as a whole, restrict movement of the central rods 5 along the installation holes 41 at the locking position, and that the locking member 6 is only operable to be at the open position when the control portion 61 is pulled.

Overall, by adjusting the position of the locking member 6, the central rods 5 can be either restricted from movement or free to move. The locking member 6 can be either pushed or pulled to reduce operational errors. Lastly, since the central rods 5 are not press-fitted to the installation holes 41, the central rods 5 can smoothly move along the installation holes 41 once the locking member 6 is at the open position.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A fiber optic connector comprising:
   a housing member;
   a positioning member that is mounted in said housing member, and that is formed with two installation holes extending in a front-rear direction, and two guiding grooves each intersecting a respective one of said installation holes;
   two central rods that are respectively and removably inserted into said installation holes, outer surrounding surface of each of said central rods being formed with an annular groove which is registered with a corresponding one of said guiding grooves; and
   a locking member that extends through said housing member to be inserted into said positioning member, and that includes a control portion disposed outside of said housing member, and two guiding portions respectively extending from two opposite ends of said control portion to be respectively inserted into said guiding grooves of said positioning member, said locking member being operable to move relative to said positioning member between a locking position, where each of said guiding portions extends into an intersection of said corresponding guiding groove and said corresponding installation hole to engage said annular groove of said corresponding central rod for restricting movement of said central rods along said installation holes, and an open position, where said guiding portions are disengaged from said annular grooves of said central rods, thereby allowing said central rods to move along said installation holes;
   wherein each of said guiding portions of said locking member has a connecting section that is connected to said control portion, and an end section that is distal from said control portion and that has a radius larger than that of said connecting section;
   wherein each of said end sections extends into the intersection of said corresponding guiding groove and said corresponding installation hole when said locking member is at the locking position; and
   wherein said end sections are respectively removed from said installation holes and disengaged from said annular grooves of said central rods when said locking member is at the open position.

* * * * *